(12) United States Patent
De Vaan

(10) Patent No.: US 7,303,287 B2
(45) Date of Patent: Dec. 4, 2007

(54) COMPENSATION OF LIGHT SOURCE INTENSITY PULSE IN SCROLLING COLOUR TYPE PROJECTION SYSTEM

(75) Inventor: Adrianus Johannes Stephanes Maria De Vaan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 238 days.

(21) Appl. No.: 10/529,732

(22) PCT Filed: Sep. 17, 2003

(86) PCT No.: PCT/IB03/04118

§ 371 (c)(1), (2), (4) Date: Mar. 30, 2005

(87) PCT Pub. No.: WO2004/032522

PCT Pub. Date: Apr. 15, 2004

(65) Prior Publication Data

US 2005/0280782 A1    Dec. 22, 2005

(30) Foreign Application Priority Data

Oct. 4, 2002   (EP)   ................................ 02079129

(51) Int. Cl.
*G03B 21/14*   (2006.01)

(52) U.S. Cl. .......................... 353/85; 353/84; 359/889
(58) Field of Classification Search .................. 353/84, 353/20, 30, 31, 34, 88, 89, 97, 85; 349/5, 349/7; 359/888, 889
See application file for complete search history.

(56) References Cited

U.S. PATENT DOCUMENTS

| 6,631,996 B2* | 10/2003 | Moench et al. ............... 353/85 |
| 2003/0011751 A1* | 1/2003 | Sakata et al. .................. 353/30 |
| 2006/0139578 A1* | 6/2006 | Nakagawa et al. ........... 353/85 |
| 2007/0076175 A1* | 4/2007 | Nakagawa et al. ........... 353/85 |

* cited by examiner

*Primary Examiner*—William C. Dowling

(57) ABSTRACT

A scrolling colour projection system comprising a lamp (4) with a pulsed drive current (20) and a colour scanner (6, 8a, 8b, 8c, 9) for generating a light beam (5b) with a plurality of scrolling colour fields, which is arranged to illuminate a display device (3) to produce a projection of an image generated by the display device. The system further includes a filtering element (31) arranged in the light path between the lamp and the projected image, and the transmission of the filtering element (31) is synchronized with the lamp current so as to cancel an intensity peak in the lamp flux. The filtering element thus effectively removes the impact of the current pulse on the light intensity, resulting in a constant intensity in the projected image, and avoiding any interference patterns.

7 Claims, 4 Drawing Sheets

COMPENSATION OF LIGHT SOURCE INTENSITY PULSE IN SCROLLING COLOUR TYPE PROJECTION SYSTEM

The present invention relates to a scrolling colour projection system comprising a pulsed lamp and a colour scanner for generating a light beam with a plurality of scrolling colour fields, arranged to illuminate a display device to produce a projection of an image generated by the display device.

Such projection systems are particular in that light from a light source is divided into a plurality of beams, which are sequentially scrolled over a display device, e.g. a reflective LCD, and then projected by means of a lens. Normally, the three beams (R, G, B) are arranged to form three horizontal bars with a total height which is large enough to cover the reflective display. The bars are scrolled, e.g. from top to bottom, and are synchronized with the display so that they complete a scrolling sequence within one picture frame.

In such projector systems, it is advantageous to use a light source, e.g. a UHP (ultra high performance) lamp from Philips, having a superposed current pulse to stabilize the arc position. In a scrolling colour type of projection system, such a current pulse may interfere with the colour scanner and result in visible interference patterns in the projected image. In principle, the pulse acts as a stroboscope, highlighting a momentary image of the scanner, and may make interference patterns in the form of colour bars or the intermediate fields (spokes) visible on the screen. If the pulse frequency is a sub-frequency of the frame rate, the interference pattern will be fixed, and if the lamp frequency is out of phase with the frame rate, the bars will roll across the screen.

It is an object of the present invention to provide a scrolling colour projector system having a reduced image interference.

This object is achieved with a projector according to the invention as specified in claim 1.

The filtering element thus effectively removes the impact of the current pulse on the light intensity, resulting in a constant intensity in the projected image. Therefore, the mentioned interference patterns do not occur.

The filtering element can be located anywhere along the light path, for example behind the projection lens, or in front of the colour scanner. A filtering element located near the lamp must have a good resistivity in order to withstand the higher light intensity. A filtering element located close to the display must be free from distortion (e.g. particles on the surface) as such distortions may be visible in the projected image. Another factor is the size of the filtering element, which varies along the light path.

According to one embodiment, the filtering element is a liquid crystal (LC) cell. The transmission of the cell is then controlled so as to be synchronized with the lamp current and adjusted in accordance with the size of the peak in light intensity, so as to accomplish the constant intensity. In order to secure a long life-time, the LC cell is preferably placed behind the projection lens, where the light intensity is lower.

According to another embodiment, the filtering element is a rotating disc having a field with reduced transmission. The frequency of said wheel is synchronized with the lamp current, so that the field crosses the light path when the peak in intensity occurs. By adapting the transmission of the field in accordance with the size of the peak, a constant light intensity can be obtained.

These and other aspects of the invention are apparent from the preferred embodiments more clearly described with reference to the appended drawings.

Figure 1:
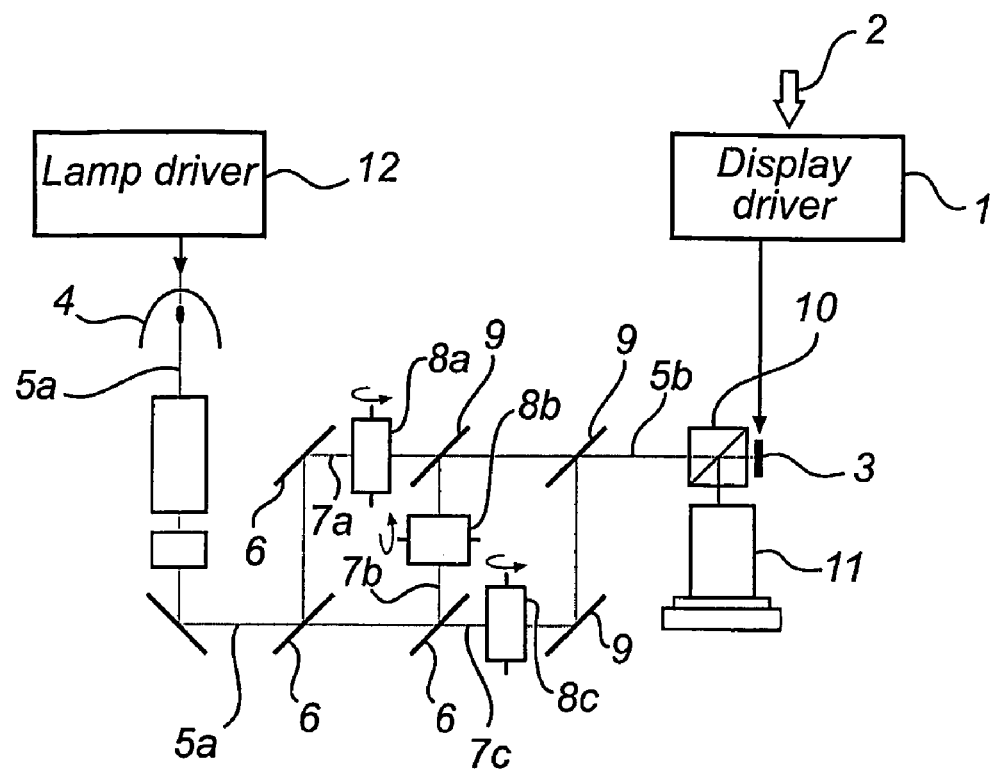
FIG. 1 is a schematic view of a scrolling colour projection system according to the prior art.

A projection system with scrolling colour scanning according to the prior art, also referred to as Scrolling Colour Sequential (SCS) system, is illustrated in FIG. 1. The system comprises a display driver 1, arranged to receive a data input stream 2, from e.g. a personal computer or a video cassette recorder (not shown), and to drive a display device 3, such as a reflective LCD. A light source 4, preferably a UHP lamp followed by an integrator, is controlled by a lamp driver 12 to generate a light beam 5a, which passes through a colour scanner (6, 8a, 8b, 8c, 9). The colour scanner converts the light beam 5a from the lamp 4 into a beam 5b having a plurality of differently coloured fields, typically three colour bars (R, G, B), continuously scrolling from top to bottom (see FIG. 2).

In the example illustrated in FIG. 1, a first set of mirrors 6 divides the beam 5a into three beams 7a, 7b, 7c. These beams are guided through three scanning prisms 8a, 8b, 8c (red, green and blue), and a second set of mirrors 9 recombines the beams to one beam 5b, as described above. The mirrors 6, 9 and the prisms 8a, 8b, 8c together form the colour scanner.

The beam 5b with scrolling colour bars 23 is directed onto the display device 3, and an image generated by the display device 3 is reflected back into a polarizing beam splitter (PBS) 10. The PBS 10 directs the reflected image to a projection lens 11, for projection on a suitable screen (not shown).

Figure 2:
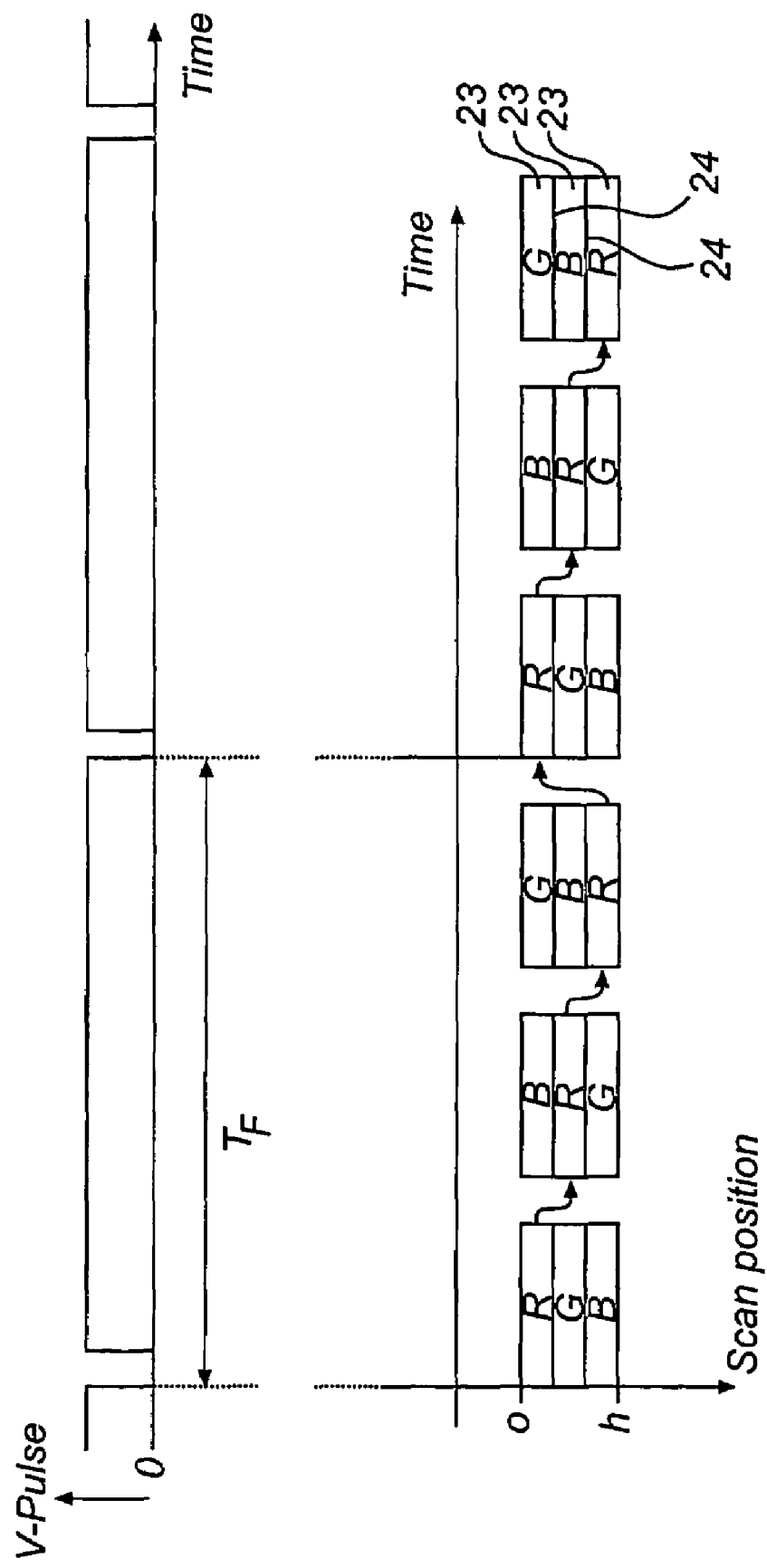
FIG. 2 shows a scanner output of the projection system in FIG. 1.

The scanning performed by the colour scanner 8a, 8b, 8c is synchronized with the frame rate of the video data 2, so that the colour bars 23 of the beam 5b complete a scrolling sequence (return to original position) in one frame period $T_F$. This is illustrated in FIG. 2.

Figure 3:
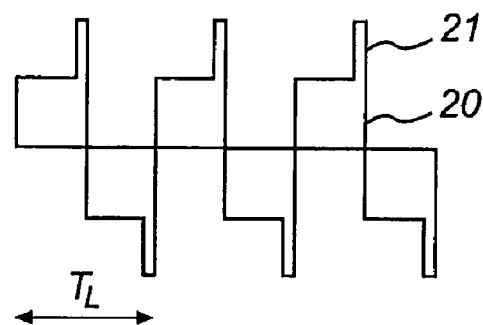
FIG. 3 is a diagram of a current waveform for a UHP lamp with pulsed arc stabilisation.
Figure 4:
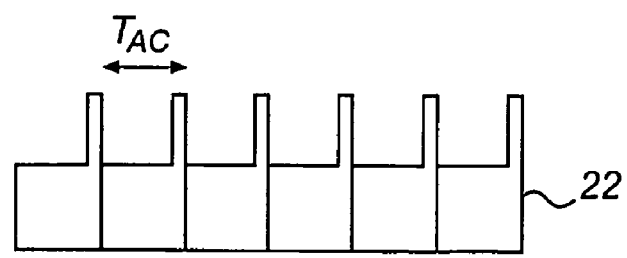
FIG. 4 is a diagram of a lamp flux output corresponding to the current in FIG. 3.

The diagram in FIG. 3 shows a typical current waveform 20 with period $T_L$ in the UHP lamp 4, including a pulse 21 to stabilize the arc position. The diagram in FIG. 4 shows the corresponding lamp flux 22 from the projection lamp 4, which is essentially the rectified waveform 20 in FIG. 3. As is clear from FIG. 4, the lamp flux 22 comprises a DC flux with a superimposed AC light flux, resulting from the stabilizing pulse 21. As a consequence of the rectification, the period $T_{AC}$ of the AC component is only half of $T_L$, i.e. the pulse frequency is twice the lamp frequency.

As mentioned above, the AC light flux resulting from the stabilization pulse acts as a fictitious light source, and causes a stroboscopic effect on the colour scanner 8a, 8b, 8c. When the frequency of this AC component of the light flux (referred to as the pulse frequency) is a sub-harmonic of the display frame rate frequency, the colour bars 23 can be 'captured' by the stroboscopic effect, resulting in visible colour bars in the projected image. When lamp frequency and frame rate frequency are locked, the visible bars are fixed in one position. If they are not locked (i.e. a-synchronic), the visible bars will be scrolling over the screen because lamp and scanner are a-synchronic. The phase between lamp frequency and frame rate frequency determines the position of the colour bars on the screen.

Figure 5:
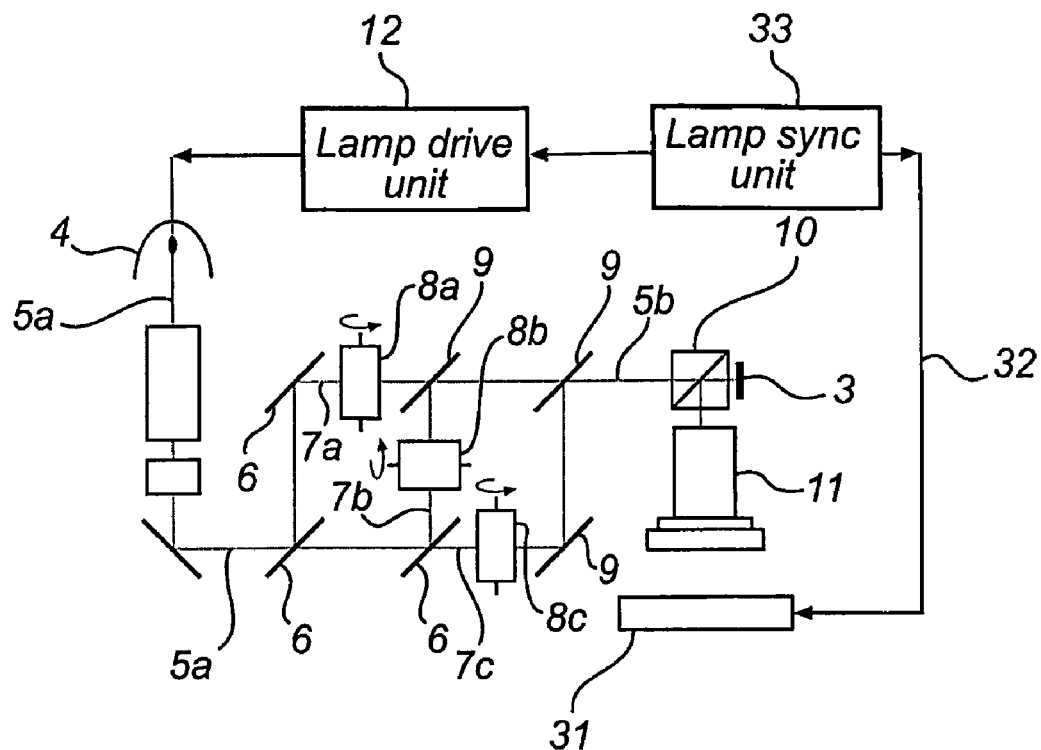
FIG. 5 is a schematic view of a scrolling colour projection system according to a first embodiment of the invention.

A first embodiment is illustrated in FIG. 5. A filtering element in the form of a liquid crystal (LC) cell 31 is arranged in the light path between the lamp and the projection of the image, in this case behind the projection lens 11. The LC cell is controlled by a drive voltage 32, which is synchronized with the lamp current 20 by means of a synchronization unit 33. In other words, the synchronization unit 33 is connected to the lamp driver 12 and to the LC cell 31.

The synchronization unit 33 is adapted to control the LC cell in such a way that the variable transmission, which is a function of the voltage 32, is decreased when a stabilization pulse 21 occurs in the lamp current 20, and a peak occurs in the lamp flux 22. The decrease in transmission is adapted to compensate for the increase in intensity present during the peak, and, as a result, the peak is cancelled and not visible in the projected image. This leads to a constant intensity in the projected image, and interference patterns are avoided.

Figure 6:
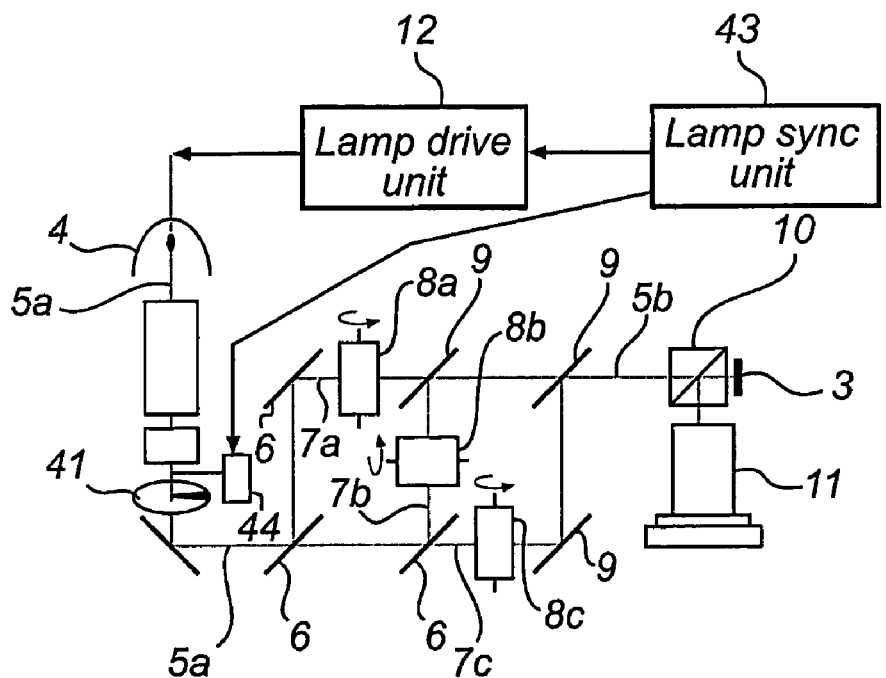
FIG. 6 is a schematic view of a scrolling colour projection system according to a second embodiment of the invention.
Figure 7:
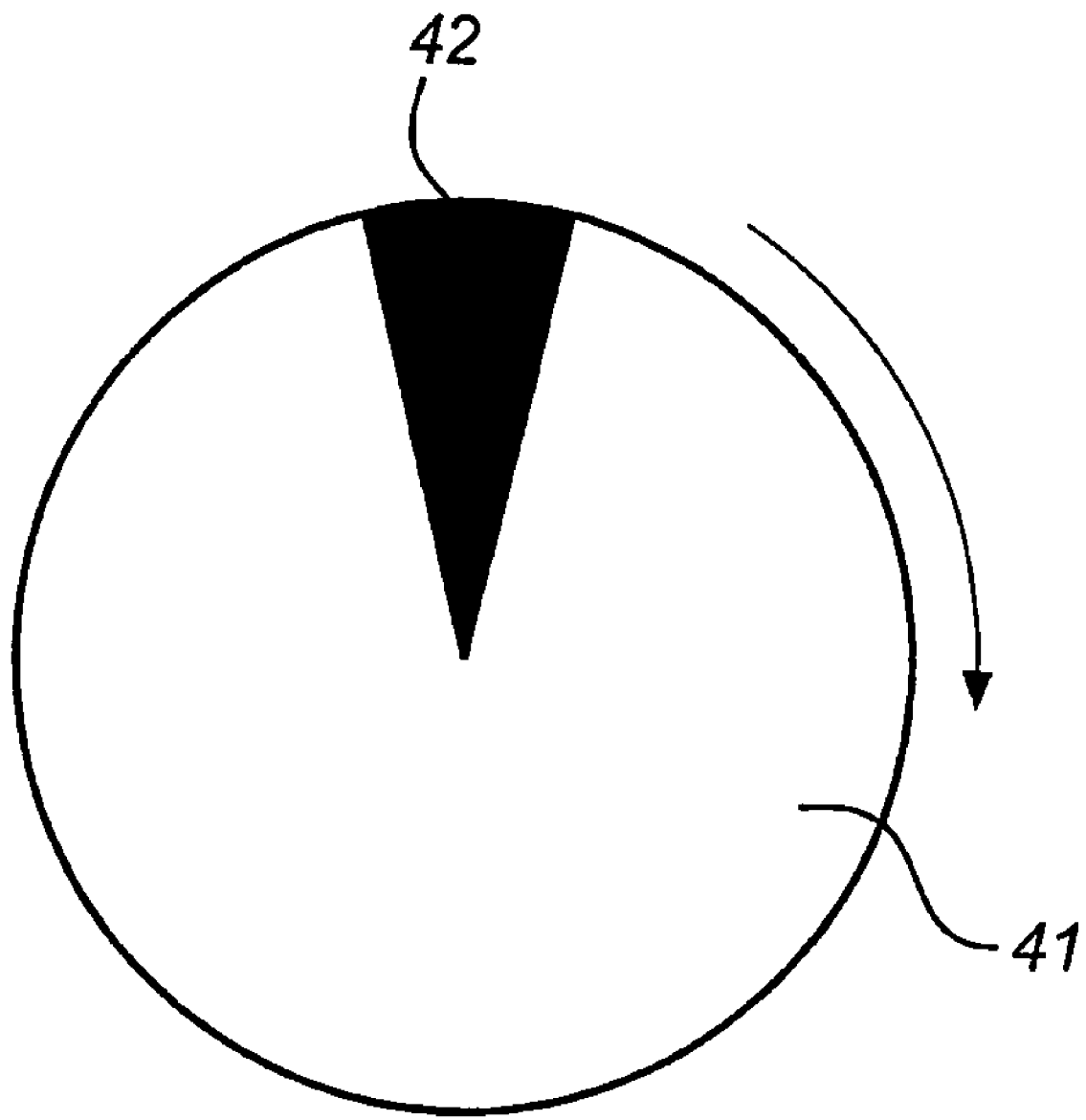
FIG. 7 shows the rotating density filter of the embodiment in FIG. 6.

A second embodiment is illustrated in FIGS. 6 and 7. In this case, the filtering element is a rotating disc 41, made of a transparent material and having a neutral density grey filter 42 patterned onto its surface. Here, the disc 41 precedes the colour scanner mirrors 6, but another location may also be found to be advantageous. As is shown in FIG. 7, the filter field 42 may be a sector of the disc 41, but may also comprise two or more sectors and/or have a different shape.

A synchronization unit 43 is connected to the lamp driver 12 and to a disc controller 44. The synchronization unit 43 is adapted to control the disc controller 44 to rotate the disc 42 with a phase and frequency such that the shaded filter field 42 passes the light path when a peak occurs in the lamp flux 22. Furthermore, the transmission of the shaded field 43 is adapted to compensate the increase in light intensity present during the peak, and, as a result, the peak is cancelled and not visible in the projected image.

It is clear that the detailed description above is related to two specific embodiments of the invention, and that these embodiments do not limit the scope of the appended claims. More specifically, the scrolling projection system can be modified by the skilled person without departing from the inventive concept. For example, the colour scanner may be of a different type than the one-schematically illustrated in the drawings. Also, other filtering elements may be envisaged, and placed at other locations along the light path.

The invention claimed is:

1. A scrolling color projection system comprising
   a lamp with a pulsed drive current that provides a varying lamp flux,
   a color scanner for generating a light beam from the lamp flux with a plurality of scrolling color fields, and
   a filtering element, wherein:
   the light beam is arranged to illuminate a display device to produce a projection of an image generated by the display device, and
   the filtering element is arranged in a light path between the lamp and the projected image, the transmission effects of the filtering element being synchronized with the pulsed drive current so as to cancel an intensity peak in the lamp flux.

2. The scrolling color projection system of claim 1, including a synchronization unit for synchronizing the filtering element with the lamp.

3. The scrolling color projection system of claim 1, including a projecting lens for projecting the image, wherein the filtering element is arranged behind the projecting lens, relative to the light path.

4. The scrolling color projection system of claim 1, wherein the filtering element precedes the color scanner.

5. The scrolling color projection system of claim 1, wherein the filtering element includes a liquid crystal cell.

6. The scrolling color projection system of claim 1, wherein the filtering element includes a rotating disc that includes at least one field with reduced transmission effects.

7. The scrolling color projection system of claim 6, the disc being transparent except for at least one sector-shaped field.

* * * * *